June 2, 1959  A. M. CUNNINGHAM  2,889,077
CONTINUOUS WEIGHER AND FEEDER
Filed Dec. 16, 1954  3 Sheets-Sheet 1

INVENTOR.
ATLEE M. CUNNINGHAM
BY
Alfred R. Fuchs
ATTORNEY

June 2, 1959  A. M. CUNNINGHAM  2,889,077
CONTINUOUS WEIGHER AND FEEDER
Filed Dec. 16, 1954  3 Sheets-Sheet 3

INVENTOR.
ATLEE M. CUNNINGHAM
BY
Alfred R. Fuchs
ATTORNEY

United States Patent Office 2,889,077
Patented June 2, 1959

2,889,077

CONTINUOUS WEIGHER AND FEEDER

Atlee M. Cunningham, Calallen, Tex.

Application December 16, 1954, Serial No. 475,735

9 Claims. (Cl. 222—77)

My invention relates to a continuous weighing and feeding device, and more particularly to a device of this character in which a rotating tubular member or cylinder is utilized for weighing the material that is fed to it at one end thereof and discharged from it at the other end thereof.

More specifically my invention comprises continuous weighing apparatus comprising an open ended tubular member that is mounted on scales in such a manner that the material flowing through the rotating tubular member is weighed by the scales, said rotating tubular member being so mounted and being of such a character that the material will be carried through the same from suitable feeding means at one end thereof to any suitable receptacle at the other end thereof at a uniform rate.

More specifically my invention comprises weighing apparatus comprising an open ended cylinder having a suitable mounting on a scalebeam so that the weight of the material flowing through the same will tend to move the scalebeam about its fulcrum, said cylinder and means for rotating the same being mounted in such a manner that the weight of the cylinder, its driving means, mounting and means for rotating the same will have a constant or uniform effect on the scale beam and the only variable effect that will be produced on the scalebeam will be by the material flowing through the tubular member or cylinder.

It is a further purpose of my invention to provide a feeding device in which such an open ended tubular member or hollow cylinder is embodied, which is mounted for rotation about its axis on the scalebeam and which scalebeam is provided with means responsive to the position of the scalebeam to control feeding means that feeds material into one end of said cylinder or tubular member to control the rate of feed thereof.

My improved weighing means, either in cooperation with controlling means for feeding means or without such controlling means, is preferably made with a smooth cylindrical inner surface and is mounted so that the axis of rotation thereof is inclined to the horizontal, but said cylinder or tubular member can be made so as to have an internal spiral or helical formation thereon for advancing the material axially of the cylinder or tubular member, and in such case the rotatable tubular member can be mounted either with its axis of rotation at such an inclination to the horizontal or with such axis of rotation extending horizontally, dependent upon the material to be fed and the character of feed that it is desired to obtain of the material lengthwise through the rotatable member.

Whether the inner surface of the cylinder or tubular member is a smooth cylinder or has a helical or spiral material advancing formation provided thereon, said inner surface must be polished so that the material will not adhere undesirably to the wall of the rotatable member.

Among the advantages of my invention are that no leveling blades are necessary for the material since the material that is being fed or transported through the weighing cylinder seeks a uniform depth in the cylinder and lumps, string, bagging and other foreign matter, will move freely through the cylinder without any interference with the feeding action thereof. Build-up of the material being fed on the inner surfaces of the rotatable member is reduced to a minimum because the finely divided material in sliding on the surface of the cylinder causes a certain amount of polishing action to take place. There are no feeding belts or flat pulleys required such as in other types of feeders that have to be cleaned and adjusted and the power that is required for operation of the apparatus is reduced to a minimum.

In the use of my invention the cylinder or tubular member having the cylindrical inner surface is rotated at a constant speed and preferably has its axis inclined at a predetermined angle to the horizontal. When such is the case a helix is generated on the inner face of the cylinder by the material moving along the inside surface thereof. However, as the cylinder is rotating continuously, this results in the building up of the material in a stream of substantially uniform depth inside the cylinder from the point where the material enters the same to the discharge end thereof, said stream being of substantially uniform width and depth, but located to one side of the bottommost portion or vertical diameter of the rotating cylinder in the direction of rotation thereof. The angle at which the axis of the cylinder is inclined determines the capacity and lineal movement of the material in the rotating weighing member. The position of the stream of material with respect to the vertical diameter of the cylinder depends on the co-efficient of friction of the material as well as the quantity of material fed into the same. The quantity fed determines the width and depth of the stream that is flowing lengthwise through the cylinder slightly to one side of the bottommost portion thereof. The material, however, has a constant linear velocity through the cylinder irrespective of the co-efficient of friction or quantity fed as long as the same angular inclination of the axis of the cylinder is maintained.

Cylinders or tubular members with cylindrical inner surfaces that are provided with helical or spiral material advancing formations thereon are particularly suitable for gritty material, such as sand, and materials that have particles having a tendency to roll on the cylindrical surface, or certain chemicals, that would not tend to build up on the metal surface, although capable of use with powdered materials such as flour.

Other objects and advantages of my invention will appear as the description of the drawings proceeds. I desire to have it understood, however, that I do not intend to limit myself to the particular details shown or described, except as defined in the claims.

Figure 2:
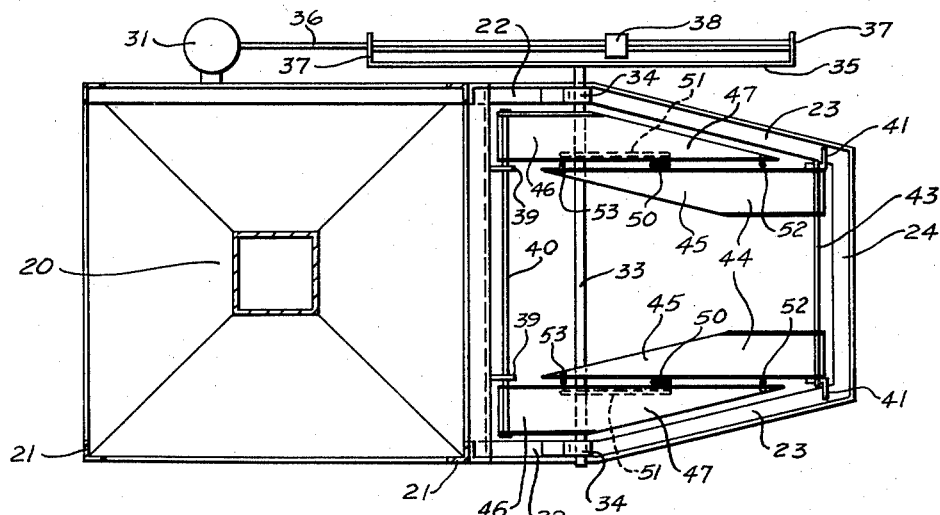
Fig. 2 is a section taken on the line 2—2 of Fig. 1, looking in the direction of the arrows.
Figure 1:
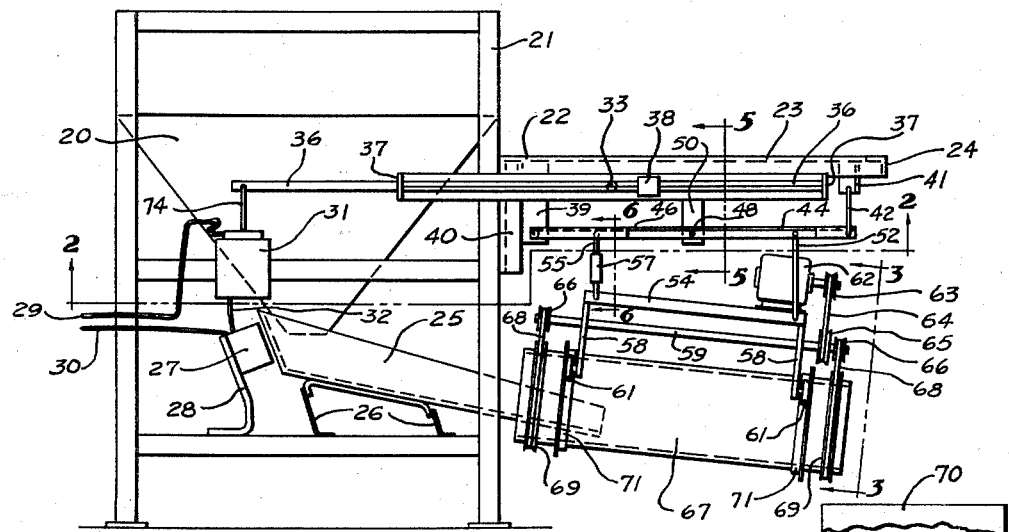
Fig. 1 is a side elevation of a feeding device embodying my improved weighing means.

Referring in detail to the drawings, in Figs. 1 and 2 a hopper 20 is shown as being mounted on a frame 21, said frame having a lateral extension thereon comprising the side members 22 that have the portions 23 inclined toward each other in the direction toward the end member 24 of said frame. Said hopper 20 discharges into a vibratory feeder 25, which is mounted in any suitable manner for vibratory movement, as on the springs 26 mounted on the frame 21, the vibratory movement thereof being accomplished by means of the electro-magnetic means 27 mounted on a suitable bracket 28 on the frame to which current is supplied from the line wires 29 and 30, one of which leads to a controlling element 31, from which the conductor 32 leads to one end of the winding of the electro-magnetic means 27, the other conductor 30 leading to the other end of said winding. The controlling means is of a character that will vary the amount of current supplied to the electro-magnetic means and thus vary the amplitude of the vibrations of the vibratory feeding member 25 to control the rate of feed of said feeding member 25, the rate of feed increasing with the increase in amplitude of the vibrations.

Figure 5:
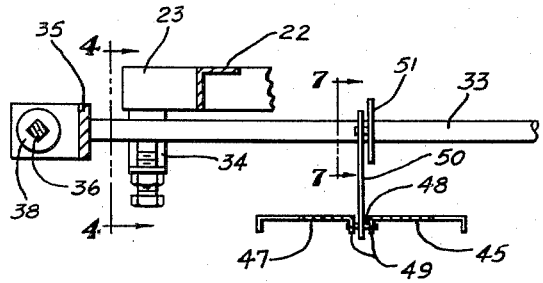
Fig. 5 is a section taken on the line 5—5 of Fig. 1 partly broken away.
Figure 4:
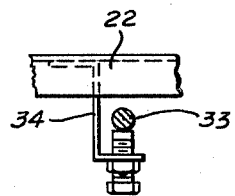
Fig. 4 is a fragmentary section on an enlarged scale, taken on the line 4—4 of Fig. 5.
Figure 6:
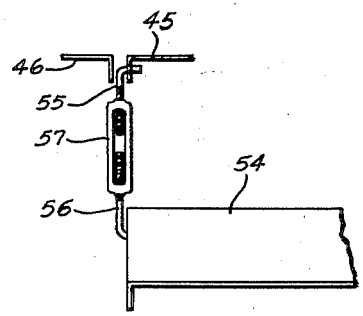
Fig. 6 is a fragmentary section taken on the line 6—6 of Fig. 1 on an enlarged scale.

Mounted on the side members of the laterally extending frame portion is a transverse shaft 33, said shaft being mounted in suitable bearings provided in the depending brackets 34 on the side members 22 of the frame, one of said bearings being shown in detail in Figs. 4 and 5 of the drawings. Fixed on one end of the shaft 33 to move therewith is a bar 35, which is a portion of a scalebeam, which comprises a bar 36 that is square in cross section, as shown in the drawings, and which is mounted in fixed position in the angular ends 37 of the bar 35, a counterweight 38 being slidably mounted on the bar 36.

A pair of brackets 39 is provided on the frame, on which a shaft 40 is mounted. A pair of brackets 41 is also provided on said frame, from which the links 42 are pivotally suspended. Said links 42 are connected by means of a transverse member 43 serving as a pivotal mounting for a pair of levers 44, which have tapering ends 45, a pair of similar levers 46 having tapering ends 47 being mounted on the shaft 40 for pivotal movement thereon. The tapering ends 45 and 47 of the levers 44 and 46 are pivotally connected together by means of pivot pins 48 extending through the flanges 49 of said levers 44 and 46. The links 42, it will be noted, will permit the members 44 to move endwise sufficiently to permit such a pivotal action of the tapering ends 45 and 47 of the members 44 and 46 on the pivots 48 as these ends are moved up and down in a manner to be described below.

A bar 50 also has a pivot opening therethrough for the pivot pin 48 and is pivotally connected at its upper end with a crank 51 fixed on the shaft 33, there being two such cranks and two such bars 50, as will be obvious from Fig. 2 of the drawings. It will accordingly be obvious that as the cranks 51 are moved up and down by means of the bars 50 this will cause rotational movement of the shaft 33 through an arc determined by the movement of the cranks 51 and such movement will be transmitted to the scalebeam.

Suspended from the levers 44 and 46 by means of pairs of links 52 and 53 is a platform 54. It will be noted that the links 53 are shorter than the links 52, thus inclining the platform 54 at an angle to the horizontal dependent upon the relative length of the links 52 and 53. While the link 53 may be of fixed length to maintain a fixed angle for the platform 54, it is shown in the drawings as being made up of a pair of screw-threaded members 55 and 56 that are connected together adjustably by means of turnbuckle 57, thus providing for adjustment of the length of the links 53 and of the adjustment of the angle of the platform 54. Said links have inturned ends at their upper and lower extremities that are pivotally mounted in the flanges of the levers 44 and 46 and the flanges of the platform 54.

Depending from the platform 54 are bracket plates 58, which are provided with suitable bearings for a shaft 59 and with suitable bearings for the pivot members 60 for the rollers 61. Also mounted on the platform 54 is a motor 62, which is a constant speed motor and which has suitable conductors (not shown) and suitable switching means for starting and stopping the same (not shown) provided therefor in the usual manner. Mounted on the shaft of the motor 62 is a pulley 63 over which a belt 64 operates, which also operates over a pulley 65 on the shaft 59. The shaft 59 is also provided with a pair of pulleys 66, said pulley 65 and pulleys 66 being fixed to the shaft 59 to rotate therewith. Suspended from the shaft 59 and thus from the paltform 54 and as a result, from the bars 50, is a cylinder 67 which is open at opposite ends thereof, the suspension of said cylinder being by means of a pair of belts 68, which operate over the pulleys 66 and over pulley formations 69 provided on the outer cylindrical surface of the cylinder 67. The vibratory feeding device 25 extends into the open end of the cylinder 67 nearest the hopper 20, while the opposite open end of the cylinder 67 is located above a suitable receptacle 70, into which it discharges the material flowing through the same. Flanged guide tracks 71 are preferably provided on the cylinder 67, with which the rollers 61 engage so as to take any load off the belt 68 caused by a tendency of the cylinder 67 to swing out of an inclined position or of movement in an axial direction.

Figure 3:
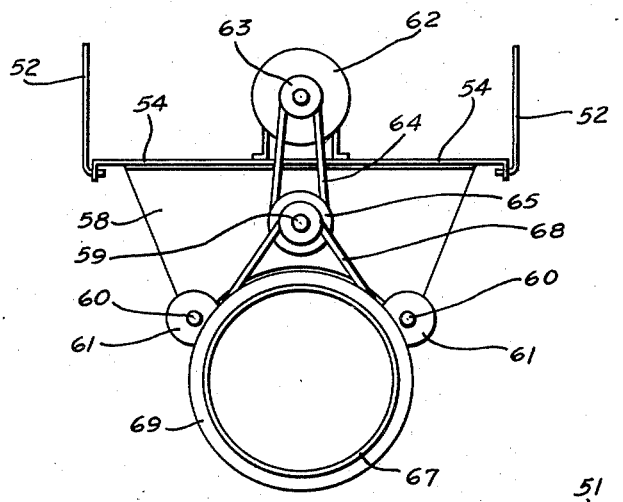
Fig. 3 is an end view taken on the line 3—3 of Fig. 1 on an enlarged scale.
Figure 7:
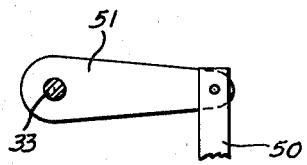
Fig. 7 is a fragmentary section taken on the line 7—7 of Fig. 5.
Figure 10:
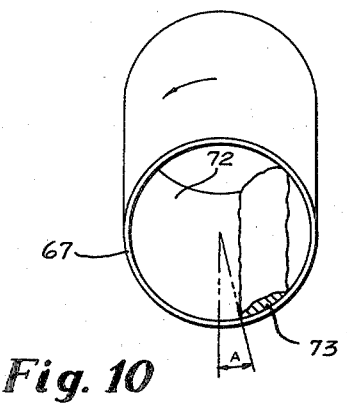
Fig. 10 is a diagrammatic end view of the rotatable tubular member shown in Fig. 1, as viewed from the discharge end thereof.

Referring to Fig. 10, it will be noted that the cylinder 67 is provided with a smooth inner cylindrical surface 72 and this surface is preferably polished so that it will be so smooth that there will be no tendency for the material passing through the cylinder 67 to build up on the inner face 72 of the wall. It will be obvious that as material is fed by the feeding member 25 into the cylinder 67, it will be transported lengthwise thereof due to the inclination of the cylinder and that due to the rotation of the cylinder the material that is being fed into the cylinder from the feeding member 25 will generate a spiral path or helical path on the inside of the cylinder, but due to the fact that it will tend to seek its lowermost level in the cylinder it will not travel up around the upper portion of the cylinder, but will remain in the lower portion thereof, as illustrated in Fig. 10, the material being indicated at 73 in Fig. 10. The stream of material will have substantially the cross sectional shape shown in Fig. 10 and will have a position to one side of the portion of the cylinder that is lowermost during its rotation. Because of the rotational action of the cylinder the amount of angular displacement of the bottom edge of this stream indicated by the angle A in Fig. 10, is dependent upon the co-efficient of friction of the material that is being fed through the cylinder, the quantity of material that is being fed into the cylinder and the rate of rotation of the cylinder. As the rate of rotation of the cylinder is preferably kept constant at a predetermined value, the angle A will only vary with the character of the material and the quantity thereof that is fed to the cylinder. The width of the stream 73 will vary similarly in accordance with these variable factors. It will also be obvious that the stream 73 will be of a uniform cross section from substantially the point of introduction thereof into the cylinder to the point of discharge thereof and that the total weight of said stream will determine the position of the levers 44 and 46 and thus of the member 50 and the angular displacement of the shaft 33 and thus the position of the scale-beam having the bar 36 as a fixed portion thereof. It will also be obvious that as the weight of the stream of material in the cylinder 67 increases the left hand end of the scalebeam as viewed in Figs. 2 and 3 will rise and that as the weight of the stream of the material in the cylinder 67 decreases the left hand end of the scalebeam as viewed in Figs. 1 and 2 will descend from a balanced position, which is that shown in Fig. 1 of the drawings.

Figure 11:
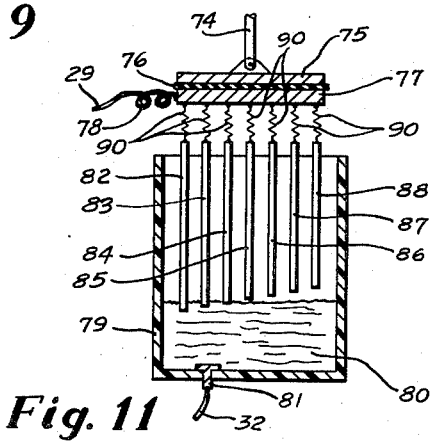
Fig. 11 is a view partly in vertical section and partly in elevation of the controlling means that is responsive to the position of the scalebeam, said controlling means being shown somewhat diagrammatically.

The scalebeam has a link 74 pivotally mounted on the bar 36 near the left hand end thereof as viewed in Fig. 1. Said link 74 is connected with the controlling member 31 in the manner shown diagrammatically in Fig. 11. A suitable supporting member 75 is pivotally mounted by means of suitable pivot ears on the lower end of the link 74 and has a layer of insulating material 76 between the same and a metallic member 77, which serves the purpose of a bus bar, the conductor 29 being connected therewith by means of a flexible portion 78. The controlling member 31 comprises a receptacle 79, which may be of insulating material, in which a body of conducting liquid, such as liquid mercury 80, is provided. A contact 81 is immersed in the liquid, such as the mercury 80, and has the conductor 32 connected therewith. Suspended from the metallic member 77 are rod-like members of conducting material 82, 83, 84, 85, 86, 87 and 88. The number of said conducting members and the arrangement thereof is not necessarily that actually utilized, but the showing is merely diagrammatic to show that said conducting members are each of a slightly different length, decreasing uniformly from the longest conducting member 82 to the shortest conducting member. A resistance 90 is interposed between each of said conducting members and the metallic member 77.

It will accordingly be obvious that if none of the conducting members has its lower end in the body of mercury 80 the circuit to the vibratory member 25 will be broken and that if only the member 82 is immersed at its lower end in the body of mercury 80 the circuit will have the highest resistance that it can have, as only one resistance 90 will be in the circuit and the vibratory member 25 will thus be vibrated at its smallest amplitude, while if all of the conducting members 82 to 88 inclusive are immersed in the body of mercury 80, then all of the resistances 90 will be in parallel and the resistance of the circuit will be the lowest and the amplitude of vibration of the vibratory feeding member 25 will be the greatest. Accordingly it will be obvious that as the amount of material in the rotating cylinder 67 is decreased below the desired amount that would be therein for the rate of feed for which the device is adjusted, the left hand end of the scalebeam will descend, causing more of the conducting members 82 to 88 to enter the liquid conducting material 80 and thus decreasing the resistance of the circuit and increasing the amplitude of vibration of the feeder 25 to increase the rate of feed to make up for the deficiency in the flow of the material through the cylinder 67. If too much material is being fed into the cylinder 67 by the vibratory feeder 25 so that the rate of feed is above that dumped, then the left hand end of the scalebeam as viewed in Fig. 1 will rise, withdrawing some of the conducting members from the body of mercury 80 and thus reducing the number of resistances 90 that are in parallel in the circuit and thereby increasing the resistance and reducing the amplitude of vibration of the vibratory feeder 25. While the weighing apparatus is shown as being utilized for controlling the rate of feed of a material to a receptacle, it can be used merely for the purpose of weighing material that is being discharged from a hopper to any suitable other receptacle.

Figure 8:
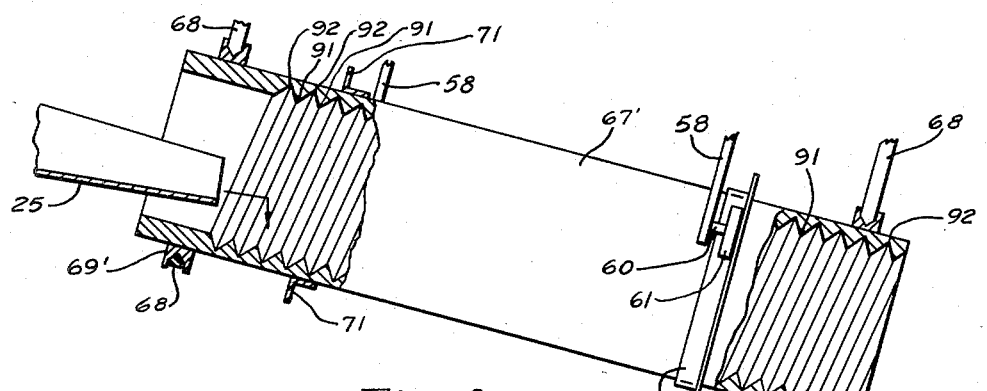
Fig. 8 is a view partly in elevation and partly in longitudinal section of a modified form of rotatable tubular member, a portion of the mounting therefor and a fragmentary portion of the feeding means leading into the same being shown therein.
Figure 9:
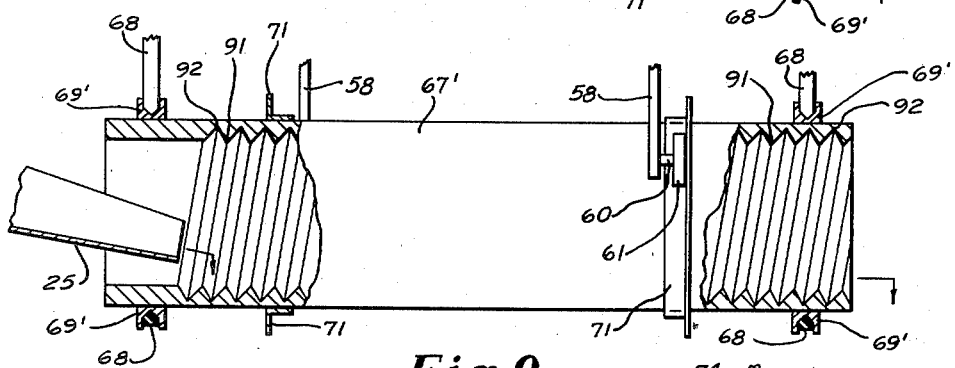
Fig. 9 is a view similar to Fig. 8 of a further modification.

Instead of providing a tubular or cylindrical member that is rotated at a constant speed, that is provided with a smooth cylindrical inner surface, a tubular member that has an inner cylindrical wall that is provided with a helical or spiral formation comprising alternating ribs 91 and grooves 92 may be provided, as shown in the rotatably mounted cylinder 67' shown in Figs. 8 and 9. Said cylinder is mounted in the same manner as the cylinder 67 on the scalebeam, being provided with suitable pulley formations 69' thereon, which are similar to the pulley formations 69 previously described and over which the belts 68 operate. Said cylinder 67' with the spiral material advancing formations 91 may be either mounted at an inclination as shown in Fig. 8, or with the axis thereof horizontal as shown in Fig. 9. The material contacting faces of the member 67' have to be smoothly finished, just as is the case with the smooth inner cylindrical surface of the cylinder 67, being preferably polished in order to prevent undesirable build-up of the material on the inner face of the cylinder. Such spiral formations are not particularly desirable for use with materials that have a tendency to pack because these would tend to build up, but are particularly suitable for use with material such as sand, or a material that has particles that will roll on the metal surface of the cylinder. The arrangement shown in Fig. 8 is that which is used where a positive continuous feed is desired, while that arrangement shown in Fig. 9 with the axis horizontal is utilized where a positive intermittent feed only is desired.

Whether the smooth inner cylindrical surface or the surface having the helical material advancing formation thereon is provided in the rotary cylinder, if the material of the proper characteristics is fed through the same it will operate in the same manner to cause a stream, extending longitudinally of the cylinder parallel to the axis thereof and angularly offset from the axis in the direction of rotation of the cylinder, to be formed in the cylinder, flowing at a uniform rate toward the discharge end thereof, as illustrated diagrammatically in Fig. 10, the rate of travel parallel to the axis of the cylinder being determined by the angle to the horizontal of the axis of the cylinder and the feed capacity of the cylinder being dependent upon this angle and the diameter of the cylindrical weighing member. The rate of feed is also, of course, dependent upon the rate of rotation of the cylinder, but the rate of rotation must not be so rapid that centrifugal force would have a tendency to make the material travel around with the cylinder over the upper portion thereof during its rotation. Preferably the rate of rotation is maintained at a uniform figure determined by the requirements of the installation at which the weighing feeder is utilized.

What I claim is:

1. The combination with a scalebeam, of an open ended hollow cylinder, a mounting member, links suspending said mounting member adjacent its opposite ends from said scalebeam, means for suspending said cylinder from said mounting member for rotation about its axis, and means mounted on said mounting member for rotating said cylinder about its axis to transport material from adjacent the one open end of said cylinder to the other open end thereof while said cylinder is mounted on said scalebeam.

2. The combination with a scalebeam, of an open ended hollow cylinder, a member mounted on said scalebeam by means of links suspending said member adjacent the opposite ends thereof, means engaging said cylinder at longitudinally spaced locations for suspending said cylinder from said member for rotation about its axis, and means mounted on said member for rotating said cylinder about its axis to transport material from adjacent the one open end of said cylinder to the other open end thereof while said cylinder is mounted on said scalebeam.

3. The combination with a scalebeam, of an open ended hollow cylinder, a member mounted on said scalebeam by means of links suspending said member adjacent the opposite ends thereof, means for suspending said cylinder from said member for rotation about its axis including a shaft mounted on said member, pulleys spaced longitudinally of said shaft, flexible driving members engaging said pulleys and embracing said cylinder to suspend the same from said shaft, and means mounted on said member driving said shaft to rotate said cylinder about its axis to transport material from adjacent the one open end of said cylinder to the other open end thereof while said cylinder is mounted on said scalebeam.

4. The combination with a scalebeam, of an open ended hollow cylinder, a member mounted on said scalebeam by means of links suspending said member adjacent the opposite ends thereof, the links adjacent one end of said member being shorter than the links at the other end thereof to suspend said member at an inclination to the horizontal, means for suspending said cylinder from said member for rotation about its axis, and means mounted on said member for rotating said cylinder about its axis to transport material from adjacent the one open end of said cylinder to the other open end thereof while said cylinder is mounted on said scalebeam.

5. The combination with a scalebeam, of an open ended hollow cylinder, a platform mounted on said scalebeam by means of links suspending said platform adjacent the opposite ends thereof, a shaft mounted on said platform, pulleys on said shaft spaced longitudinally thereof, flexible driving members engaging said pulleys and embracing said cylinder to suspend the same from said shaft, and driving means for said shaft mounted on said platform to transport material from adjacent the one open end of said cylinder to the other open end thereof while said cylinder is mounted on said scalebeam.

6. The combination with a scalebeam, of an open ended hollow cylinder, a member mounted on said scalebeam by means of links suspending said member adjacent the opposite ends thereof, means for suspending said cylinder from said member for rotation about its axis including means for holding said cylinder against endwise movement relative to said member, and means mounted on said member for rotating said cylinder about its axis to transport material from adjacent the one open end of said cylinder to the other open end thereof while said cylinder is mounted on said scalebeam.

7. The combination with a scalebeam, of an open ended hollow cylinder, a platform mounted on said scalebeam by means of links suspending said platform adjacent the opposite ends thereof, a shaft mounted on said platform, pulleys on said shaft spaced longitudinally thereof, flexible driving members engaging said pulleys and embracing said cylinder to suspend the same from said shaft, means for holding said cylinder against endwise movement relative to said platform, and driving means for said shaft mounted on said platform to rotate said cylinder and transport material from adjacent the one open end of said cylinder to the other open end thereof while said cylinder is mounted on said scalebeam.

8. The combination with a scalebeam, of an open ended hollow cylinder, a platform mounted on said scalebeam by means of links suspending said platform adjacent the opposite ends thereof, the links at one end of said platform being adjustable in length, a shaft mounted on said platform, pulleys on said shaft spaced longitudinally thereof, flexible driving members engaging said pulleys and embracing said cylinder to suspend the same from said shaft, and driving means for said shaft mounted on said platform to rotate said cylinder and transport material from adjacent the one open end of said cylinder to the other open end thereof while said cylinder is mounted on said scalebeam.

9. The combination with a scalebeam, of a tubular member having a continuous smooth inner surface of uniform diameter and open at both ends thereof to its full diameter to provide a material inlet at one open end thereof and a discharge outlet at the other open end thereof, a plurality of suspending means for said tubular member spaced longitudinally of said scalebeam, means for mounting said tubular member for rotation about its axis, means for rotating said tubular member for transporting material lengthwise thereof from adjacent said inlet to said outlet while said tubular member is suspended from said scalebeam, said outlet being at a lower level than said inlet thereby positioning said tubular member with its axis at an inclination to the horizontal, and means for adjusting one of said suspending means to vary the angle of inclination of said axis.

References Cited in the file of this patent

UNITED STATES PATENTS

| | | |
|---|---|---|
| 763,268 | Edwards | June 21, 1904 |
| 1,129,866 | Hamel | Mar. 2, 1915 |
| 2,218,390 | Alexander | Oct. 15, 1940 |
| 2,276,383 | Francis | Mar. 17, 1942 |
| 2,340,030 | Weyandt | Jan. 25, 1944 |
| 2,630,312 | Carrier et al. | Mar. 3, 1953 |

FOREIGN PATENTS

| | | |
|---|---|---|
| 91,808 | Germany | July 28, 1896 |